United States Patent
Esseghir et al.

(10) Patent No.: US 8,586,170 B2
(45) Date of Patent: Nov. 19, 2013

(54) METHOD FOR THE DELIVERY OF A MULTI-COMPONENT REACTIVE SYSTEM TO A MOLDING OPERATION

(75) Inventors: Mohamed Esseghir, Monroe Township, NJ (US); Jeffrey M. Cogen, Flemington, NJ (US); Saurav S. Sengupta, Somerset, NJ (US); Thomas J. Parsons, Freeland, MI (US)

(73) Assignee: Dow Global Technologies LLC, Midland, MI (US)

( * ) Notice: Subject to any disclaimer, the term of this patent is extended or adjusted under 35 U.S.C. 154(b) by 953 days.

(21) Appl. No.: 12/630,262

(22) Filed: Dec. 3, 2009

(65) Prior Publication Data
US 2010/0159206 A1 Jun. 24, 2010

Related U.S. Application Data

(60) Provisional application No. 61/140,157, filed on Dec. 23, 2008.

(51) Int. Cl.
*B32B 3/30* (2006.01)

(52) U.S. Cl.
USPC .......... 428/172; 428/36.92; 428/451; 526/72; 526/279; 156/244.11; 156/244.12

(58) Field of Classification Search
USPC .......... 428/172, 451, 36.92; 526/50, 279, 72; 174/36, 102, 110; 156/244.11–244.27
See application file for complete search history.

(56) References Cited

U.S. PATENT DOCUMENTS

| | | | |
|---|---|---|---|
| 4,025,693 A * | 5/1977 | Milne | 428/447 |
| 4,661,303 A | 4/1987 | Chum et al. | |
| 5,094,793 A | 3/1992 | Schrenk et al. | |
| 5,272,236 A | 12/1993 | Lai et al. | |
| 5,278,272 A | 1/1994 | Lai et al. | |
| 5,843,552 A | 12/1998 | Karrfalt | |
| 5,986,028 A | 11/1999 | Lai et al. | |
| 5,993,922 A * | 11/1999 | Babrowicz et al. | 428/35.7 |
| 6,379,791 B1 | 4/2002 | Cernohous et al. | |
| 6,525,130 B1 * | 2/2003 | Flowers | 524/588 |
| 6,808,579 B1 | 10/2004 | Pulford et al. | |
| 7,049,506 B2 * | 5/2006 | Head | 174/36 |
| 7,138,169 B2 * | 11/2006 | Shiota et al. | 428/134 |
| 7,413,807 B2 | 8/2008 | Qiu et al. | |
| 2003/0017294 A1 | 1/2003 | MacDonell et al. | |
| 2007/0232497 A1 * | 10/2007 | Chew et al. | 504/360 |
| 2010/0236811 A1 * | 9/2010 | Sasse et al. | 174/110 PM |

FOREIGN PATENT DOCUMENTS

| | | |
|---|---|---|
| EP | 1829679 A1 | 9/2007 |
| WO | 01/21688 A1 | 3/2001 |
| WO | 2008/024558 A2 | 2/2008 |

OTHER PUBLICATIONS

SigmaAldrich, Polydimethylsiloxane, hydroxy terminated, http://www.sigmaaldrich.com/MSDS/MSDS/DisplayMSDSPage.do?country=US&language=en&productNumber=432970&brand=ALDRICH&PageToGoToURL=http%3A%2F%2Fwww.sigmaaldrich.com%2Fcatalog%2Fsearch%3Finterface%3DAll%26term%3Dpoly%28dimethylsiloxane%29%2C%2520hydroxy%2520terminated%26lang%3Den%26region%3DUS%26.*

* cited by examiner

*Primary Examiner* — Maria Veronica Ewald
*Assistant Examiner* — Brian Handville
(74) *Attorney, Agent, or Firm* — Whyte Hirschboeck Dudek S.C.

(57) ABSTRACT

Tapes comprising (A) a first ribbon comprising (1)(a) a polyolefin containing at least one silane functionality, and (1)(b) a hydroxy-terminated silicone polymer, or (2) a blend of a vinyl silane, polyolefin, organic initiator, e.g., peroxide, and a hydroxy-terminated silicone polymer, and (B) a second ribbon comprising a catalyst masterbatch, the second ribbon carried on the first ribbon, allow for the delivery of a consistent mixture of resin and catalyst to an injection molding machine.

9 Claims, 2 Drawing Sheets

METHOD FOR THE DELIVERY OF A MULTI-COMPONENT REACTIVE SYSTEM TO A MOLDING OPERATION

CROSS-REFERENCE TO RELATED APPLICATIONS

The present application claims priority to U.S. patent application Ser. 61/140,157, filed on Dec. 23, 2008, the entire content of which is incorporated by reference herein.

STATEMENT REGARDING FEDERALLY SPONSORED RESEARCH OR DEVELOPMENT

None

FIELD OF THE INVENTION

This invention relates to molding operations. In one aspect, the invention relates to the formation of articles through the use of injection molding techniques while in another aspect, the invention relates to the formation of such articles in a manner that allows for off-mold curing. In yet another aspect, the invention relates to a method of feeding a two-component reactive system to an extruder designed for limited mixing while in still another aspect, the invention relates to a method of forming a mix of a base compound and a catalyst prior to feeding the mix to an extruder.

BACKGROUND OF THE INVENTION

Siloxane-modified polyolefin elastomers are under development for use in the manufacture of power cable accessories, e.g., cable joints, splices, separable connectors, cable termination, etc., by injection molding. These new polymers offer the possibility of injecting thick parts in a thermoplastic mode, de-molding the part, and storing it for latent cure off-mold under ambient conditions, i.e., without the need for external moisture or heat. This approach has the potential of substantially cutting the manufacturing cycle time for making these parts.

This new technology is a two-component system comprising (1) a polyolefin containing silane functionality in combination with a hydroxy-terminated silicone polymer, or a blend of a vinyl silane, polyolefin, peroxide and a hydroxy-terminated silicone polymer, and (2) a catalyst masterbatch, i.e., a catalyst carried in a suitable base polymer. These components need to be adequately blended with one another in a melt mixing operation prior to the injection step to ensure efficient and uniform crosslinking.

One potential challenge for the implementation of this technology is that the current injection molding manufacturing process relies on rubber injection molding equipment in which the material is first roll-milled and then shaped into a strip, i.e., tape, for feeding into an extruder mounted on the molding machine. These machines are typically fitted with rubber extruders which are designed for simple masticating and pressurization. These extruders are typically short in length, and thus have limited, if any, mixing capability.

Accordingly, a need exists for a method by which the reactive base compound and catalyst masterbatch are delivered to the injection molding machine without equipment modification and with minimum interaction between the two components prior to feeding to the molding machine so as to avoid premature reaction (scorch) of the components in the melt.

SUMMARY OF THE INVENTION

In one embodiment the invention is a tape comprising (A) a first ribbon comprising a first compound, and (B) a second ribbon comprising a second compound, the second ribbon carried on the first ribbon and the first and second compounds reactive with one another under ambient conditions, e.g., 23° C. and atmospheric pressure. In one embodiment the first compound is a crosslinkable resin, e.g., a polyolefin comprising cure sites, and the second compound is a catalyst that promotes the cure of the crosslinkable resin under ambient conditions.

In one embodiment the invention is a tape comprising (A) a first ribbon comprising (1)(a) a polyolefin containing at least one silane functionality, and (1)(b) a hydroxy-terminated silicone polymer, or (2) a blend of a vinyl silane, polyolefin, organic initiator, e.g., a peroxide, and a hydroxy-terminated silicone polymer, and (B) a second ribbon comprising a catalyst masterbatch, the second ribbon carried on the first ribbon. In one embodiment the first and second ribbons are in direct contact with one another while in another embodiment, the first and second ribbons are separated by a third component, typically a third ribbon intermediate between the first and second ribbons. In one embodiment, the third component is an adhesive. In one embodiment the third component is a barrier resin. In one embodiment the third component is both an adhesive and a barrier resin.

In one embodiment, the first ribbon comprises a groove shaped and sized to receive and hold the second ribbon. Preferably the groove is in the machine direction of the tape, and the groove can be continuous or intermittent. In other embodiments the peroxide may reside in the second and/or third ribbon in addition to or in substitution for residing in the first ribbon.

In one embodiment the invention is a process for making a tape comprising (A) a first ribbon comprising (1)(a) a polyolefin containing at least one silane functionality, and (1)(b) a hydroxy-terminated silicone polymer, or (2) a blend of a vinyl silane, polyolefin, organic initiator and a hydroxy-terminated silicone polymer, and (B) a second ribbon comprising a catalyst masterbatch, the second ribbon carried on the first ribbon, the method comprising the steps of (i) forming, e.g., extruding, the first ribbon, (ii) forming, e.g., extruding, the second ribbon, and (iii) joining, e.g., physical compression, chemical adhesion, etc., the first and second ribbons. In one embodiment the first and second ribbons are co-extruded. In one embodiment the first ribbon is extruded with a machine-direction groove and allowed to solidify, and then the second ribbon is formed (e.g., extruded), solidified, and then fitted into the groove of the first ribbon, with or without the aid of an adhesive. In one embodiment a third component is placed between the first and second ribbons. In one embodiment all three components are co-extruded and joined to one another in a single operation.

In another embodiment the invention is a tape comprising (A) a ribbon comprising (1)(a) a polyolefin containing at least one silane functionality, and (1)(b) a hydroxy-terminated silicone polymer, or (2) a blend of a vinyl silane, polyolefin, organic initiator and a hydroxy-terminated silicone polymer, and (B) a second component comprising a catalyst masterbatch dosed, i.e., sprayed, onto the ribbon. In one embodiment the catalyst masterbatch is dosed onto the ribbon just prior to feeding the ribbon into an extruder.

In one embodiment the invention is a multilayered tape comprising (A) a first layer comprising (1)(a) a polyolefin containing at least one silane functionality, and (1)(b) a hydroxy-terminated silicone polymer, or (2) a blend of a vinyl silane, polyolefin, organic initiator and a hydroxy-terminated silicone polymer, and (B) a second layer comprising a catalyst masterbatch, the second layer carried on the first ribbon, and (C) optionally an intermediate layer between the first and second layers. In one embodiment the intermediate layer comprises a material that is not porous to the materials of the first and second layers and thus serves as a barrier layer between the first and second layers.

In one embodiment the invention is a process for making injection molded articles, the process comprising feeding into an injection molding machine a tape comprising (A) a first ribbon comprising (1)(a) a polyolefin containing at least one silane functionality, and (1)(b) a hydroxy-terminated silicone polymer, or (2) a blend of a vinyl silane, polyolefin, organic initiator and a hydroxy-terminated silicone polymer, and (B) a second component comprising a catalyst masterbatch, the second component carried on the first ribbon. In one embodiment, the first ribbon comprises a machine-direction groove, and the second component is in the form of a ribbon that is fitted into the groove of the first ribbon. In one embodiment, the second component is sprayed onto the first ribbon at the time the first ribbon is fed into the injection molding machine. In one embodiment the second component is dosed directly into the injection molding machine simultaneously with the feeding of the first ribbon to the injection molding machine, as opposed to dosing, e.g., spraying, the first ribbon with the second component.

The tapes and methods of the invention provide an advantage over a single tape made by melt blending (A) a polyolefin containing silane functionality in combination with a hydroxy-terminated silicone polymer, or a blend of a vinyl silane, polyolefin, peroxide organic initiator and a hydroxy-terminated silicone polymer, with (B) a catalyst masterbatch, because the single tape made by melt blending the two components will have a short shelf-life and likely require the tape to be made at the injection molding site immediately prior to use because of limited storage life. The tapes and methods of the invention will also provide an advantage over individual tapes of the first and second components and then individually feeding these tapes to an injection extruder because simultaneous, consistent feeding of these tapes at the proper ratio is problematic at best which, in turn, can lead to loss of catalyst feed.

The tapes and methods of this invention allow the delivery of a consistent mixture of resin and catalyst to an injection molding extruder. These tapes can be made off-line and supplied to a remote molding operation, and these tapes and methods eliminate the need for equipment modification.

DETAILED DESCRIPTION OF THE PREFERRED EMBODIMENT

Definitions

Figure 1A:
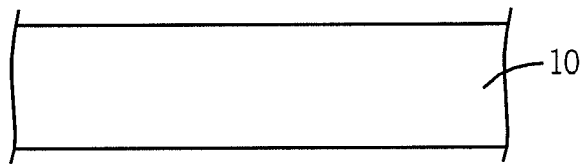
FIG. 1A is a top plan view of a base resin tape or ribbon.

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the amount of catalyst in the masterbatch, the relative amounts of base resin and catalyst masterbatch in the tape, and various temperatures and other process ranges.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds. The term, "atom" refers to the smallest constituent of an element regardless of ionic state, that is, whether or not the same bears a charge or partial charge or is bonded to another atom. The term "amorphous" refers to a polymer lacking a crystalline melting point as determined by differential scanning calorimetry (DSC) or equivalent technique.

"Composition" and like terms mean a mixture or blend of two or more components. For example, in the context of preparing a silane-grafted ethylene polymer, a composition would include at least one ethylene polymer, at least one vinyl silane, and at least one free radical initiator. In the context of preparing a cable sheath or other article of manufacture, a composition would include an ethylene-vinylsilane copolymer, a catalyst cure system and any desired additives such as lubricant, fillers, anti-oxidants and the like.

"Blend," "polymer blend" and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" means a polymeric compound prepared by polymerizing monomers, whether of the same or a different type. The generic term polymer thus embraces the term homopolymer, usually employed to refer to polymers prepared from only one type of monomer, and the term interpolymer as defined below. It also embraces all forms of interpolymers, e.g., random, block, homogeneous, heterogeneous, etc. The terms "ethylene/α-olefin polymer" and "propylene/α-olefin polymer" are indicative of interpolymers as described below.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc.

"Polyolefin", "olefinic polymer", "olefinic interpolymer", and like terms mean a polymer derived from simple olefins. Representative polyolefins include polyethylene, polypropylene, polybutene, polyisoprene and their various interpolymers.

"Base resin", "base compound" and like terms mean a composition comprising a polyolefin containing silane functionality in combination with a hydroxy-terminated silicone polymer, or a blend of a vinyl silane, polyolefin, optionally an organic initiator and a hydroxy-terminated silicone polymer.

"Catalyst masterbatch" and like terms mean a composition comprising (i) a catalyst to promote a reaction of the polyolefin containing silane functionality with the hydroxy-terminated silicone polymer, and (ii) a carrier resin. Typically the carrier resin is the same as the polyolefin, without the silane functionality, in the base resin. Alternatively, the carrier resin can be a resin different from the base resin or a solvent, i.e., a material that improves the ability the catalyst to mix with the base polymer in the injection molding step.

"Ribbon", "tape" and like terms mean a narrow band or strip of material, usually polymeric material, of indefinite length. Tape and ribbon are often used interchangeably. A ribbon can comprise a single layer, or multiple micro-layers such as those described in U.S. Pat. No. 5,094,793. A tape can comprise a single ribbon or two or more ribbons.

Although the invention is described primarily in terms of a polyolefin containing at least one silane functionality and a catalyst masterbatch, the invention applies to any two materials or compounds that are reactive with one another under ambient conditions. As such, other polymers can be substituted for the polyolefin and other compounds can be substituted for the catalyst masterbatch.

Polyolefin

The density of the polyolefins used in the practice of this invention, either in the base resin or in the masterbatch, can range before modification with silane or other functionality from 0.855 or less to 0.960 or more grams per cubic centimeter ($g/cm^3$). The preferred polyolefins used in both the base resin and the masterbatch typically have, before modification with silane functionality, a density of less than 0.930, preferably less than 0.910, more preferably less than 0.890, even more preferably less than 0.880 and even more preferably less than 0.870. The polyolefin copolymers typically have, before modification with silane functionality, a density greater than 0.850, preferably greater than 0.852 and more preferably greater than 0.855, $g/cm^3$. Density is measured by the procedure of ASTM D-792. These relatively low density polyolefins are generally characterized as semi-crystalline, flexible and having good optical properties, e.g., high transmission of visible and UV-light and low haze.

The polyolefins used in both the base resin and the masterbatch of this invention typically have, before modification with silane functionality, a melt index greater than 0.10 and preferably greater than 1 gram per 10 minutes (g/10 min). The polyolefins typically have a melt index of less than 75 and preferably of less than 20, g/10 min. Melt index is measured by the procedure of ASTM D-1238 (190° C./2.16 kg).

The polyolefins used in both the base resin and the masterbatch of this invention can be made by any process, e.g., solution, slurry, gas phase, batch, continuous, high pressure, low pressure, etc., and with any catalyst, e.g., Ziegler-Natta, metallocene, constrained geometry, etc. In one embodiment, the polyolefins made with Ziegler-Natta catalysts and under high pressure.

The polyolefins used in both the base resin and the masterbatch of this invention include, but are not limited to, ethylene/alpha-olefin interpolymers having an α-olefin content of between 15, preferably at least 20 and even more preferably at least 25, weight percent (wt %) based on the weight of the interpolymer. These interpolymers typically have an α-olefin content of less than 50, preferably less than 45, more preferably less than 40 and even more preferably less than 35, wt % based on the weight of the interpolymer. The α-olefin content is measured by $^{13}C$ nuclear magnetic resonance (NMR) spectroscopy using the procedure described in Randall (*Rev. Macromol. Chem. Phys.*, C29 (2&3)). Generally, the greater the α-olefin content of the interpolymer, the lower the density and the more amorphous the interpolymer.

The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, are α-olefins and can be used in place of some or all of the α-olefins described above. Similarly, styrene and its related olefins (for example, α-methylstyrene, etc.), and acrylic and methacrylic acid and their respective ionomers, and acrylates and methacrylates, are α-olefins for purposes of this invention. Illustrative polyolefin copolymers include ethylene/propylene, ethylene/butene, ethylene/1-hexene, ethylene/1-octene, ethylene/styrene, and the like. Ethylene/acrylic acid (EAA), ethylene/methacrylic acid (EMA), ethylene/acrylate or methacrylate, ethylene/vinyl acetate and the like are also polyolefin copolymers for purposes of this invention. Illustrative terpolymers include ethylene/propylene/1-octene, ethylene/propylene/butene, ethylene/butene/1-octene, and ethylene/butene/styrene. The copolymers can be random or blocky.

More specific examples of olefinic interpolymers useful in this invention include very low density polyethylene (VLDPE) (e.g., FLEXOMER® ethylene/1-hexene polyethylene made by The Dow Chemical Company), homogeneously branched, linear ethylene/α-olefin copolymers (e.g. TAFMER® by Mitsui Petrochemicals Company Limited and EXACT® by Exxon Chemical Company), homogeneously branched, substantially linear ethylene/α-olefin polymers (e.g., AFFINITY® and ENGAGE® polyethylene available from The Dow Chemical Company), and olefin block copolymers such as those described in U.S. Pat. No. 7,355,089 (e.g., INFUSE® available from The Dow Chemical Company). The more preferred polyolefin copolymers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

The polyolefin copolymers useful in the practice of this invention also include propylene, butene and other alkene-based copolymers, e.g., copolymers comprising a majority of units derived from propylene and a minority of units derived from another α-olefin (including ethylene). Exemplary propylene polymers useful in the practice of this invention include the VERSIFY® polymers available from The Dow Chemical Company, and the VISTAMAXX® polymers available from ExxonMobil Chemical Company.

Blends of any of the above olefinic interpolymers can also be used in this invention, and the polyolefin copolymers can be blended or diluted with one or more other polymers to the extent that the polymers of this invention constitute at least about 70, preferably at least about 75 and more preferably at least about 80, weight percent of the blend.

Silane Functionality

The polyolefins used in the base resin of this invention contain, of course, silane functionality, e.g., alkoxysilane groups. The silane functionality is included in the polyolefin either through grafting or copolymerization. Any silane that will effectively graft to the polyolefin or copolymerize with the olefin monomer can be used in the practice of this invention. Suitable silanes include unsaturated silanes that comprise an ethylenically unsaturated hydrocarbyl group, such as a vinyl, allyl, isopropenyl, butenyl, cyclohexenyl or γ-(meth) acryloxy allyl group, and a hydrolyzable group, such as, for example, a hydrocarbyloxy, hydrocarbonyloxy, or hydrocarbylamino group. Examples of hydrolyzable groups include methoxy, ethoxy, formyloxy, acetoxy, proprionyloxy, and alkyl or arylamino groups. Preferred silanes are the unsaturated alkoxy silanes which can be grafted onto the polymer. These silanes and their method of preparation are more fully described in U.S. Pat. No. 5,266,627. Vinyl trimethoxy silane, vinyl triethoxy silane, γ-(meth)acryloxy propyl trimethoxy silane and mixtures of these silanes are the preferred silane crosslinkers for is use in this invention.

Alternatively, silane copolymers, e.g., SILINK™ poly (ethylene-co-vinyltrimethoxysilane) copolymer, can be used in place of or in combination with polyolefins grafted or otherwise modified with alkoxysilane groups.

The amount of units derived from the vinyl silane that are either grafted to or incorporated into the polyolefin backbone can vary widely depending upon the nature of the polyolefin, the silane, the processing conditions, the grafting efficiency, the ultimate application, and similar factors, but typically the amount is at least 0.2, preferably at least 0.5, wt % based on the weight of the polyolefin. Considerations of convenience and economy are usually the two principal limitations on the maximum amount of units derived from a vinyl silane grafted to or incorporated into the polyolefin backbone, and typically the maximum amount of such units does not exceed 5, preferably it does not exceed 3, wt % based on the weight of the polyolefin.

The vinyl silane is grafted to the polyolefin by any conventional method, typically in the presence of a free radical initiator e.g. peroxide, or by ionizing radiation, etc. Organic initiators are preferred, such as any one of the peroxide initiators, for example, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, and tert-butyl peracetate. The amount of initiator can vary, but it is typically present in an amount of at least 0.01, preferably at least 0.03, wt %. Typically, the initiator does not exceed 0.15, preferably it does not exceed about 0.10, wt %. The weight ratio of vinyl silane to initiator also can vary widely, but the typical vinyl silane:initiator weight ratio is between 10:1 to 150:1, preferably between 18:1 and 100:1. The polyolefin can be grafted with the vinyl silane either (1) before the base resin is formulated, e.g., the embodiment in which the base resin comprises a polyolefin containing silane functionality in combination with a hydroxy-terminated silicone polymer, or (2) after the base resin is formulated, e.g., the embodiment in which the base resin comprises a blend of a vinyl silane, polyolefin, organic initiator and a hydroxy-terminated silicone polymer. In the latter embodiment, the grafting occurs after feeding the tape to the injection molding machine. In the former embodiment, any conventional method can be used to graft the silane crosslinker to the polyolefin, and one preferred method is melt blending in a reactor extruder, such as a twin-screw extruder or a Buss kneader at appropriate temperatures depending on the polymer and the initiator used.

Hydroxy-Terminated Silicone Polymer

The selection of suitable hydroxy-terminated silicone polymers for use in this invention is limited to those silicone polymers that can be blended with either (1) a polyolefin containing silane functionality, or (2) a mixture of vinyl silane, polyolefin and peroxide. This ability to mix will typically be affected by the viscosity of the hydroxy-terminated silicone polymer which generally relates to its molecular weight. Typically, the viscosity of the hydroxy-terminated silicone polymer ranges from 80 to about 2500 centistokes (cs). Such viscosities are typical for silicone softeners or lubricants found in the market.

Non-limiting examples of useful hydroxy-terminated silicone polymers include those of the following formula (I):

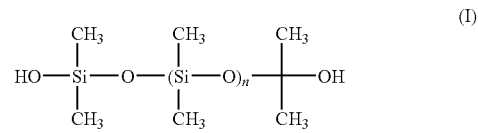

in which "n" is from 3 to 20, although other hydroxy-terminated silicone polymers may be employed within the scope of the present invention. Notably, silicone polymers according to the foregoing formula (I) will have a viscosity in the range of from 80 to about 2500 cs.

Catalyst

The reaction of the polyolefin containing silane functionality with the hydroxy-terminated silicone polymer is accelerated with a cure catalyst, and any catalyst that will provide this function can be used in the practice of this invention. These catalysts generally include organic bases, carboxylic acids and organometallic compounds including organic titanates and complexes or carboxylates of lead, cobalt, iron, nickel, zinc and tin. Illustrative catalysts include dibutyl tin dilaurate, dioctyl tin maleate, dibutyl tin diacetate, dibutyl tin dioctoate, stannous acetate, stannous octoate, lead naphthenate, zinc caprylate and cobalt naphthenate. Tin carboxylates such as dibutyl tin dilaurate, dimethyl hydroxy tin oleate, dioctyl tin maleate, di-n-butyl tin maleate and titanium compounds such as titanium 2-ethylhexoxide are particularly effective for use in this invention.

Additives

The polymeric materials, e.g., the base resin and the catalyst masterbatch, of this invention can comprise additives other than or in addition to cure catalysts. For example, such other additives include UV-stabilizers and processing stabilizers such as trivalent phosphorus compounds. The UV-stabilizers include hindered phenols such as Cyasorb UV2908 and hindered amines such as Cyasorb UV 3529, Hostavin N30, Univil 4050, Univin 5050, Chimassorb UV 119, Chimassorb 944 LD, Tinuvin 622 LD and the like. The phosphorus compounds include phosphonites (PEPQ) and phosphites (Weston 399, TNPP, P-168 and Doverphos 9228). The amount of UV-stabilizer is typically from about 0.1 to 0.8%, and preferably from about 0.2 to 0.5%. The amount of processing stabilizer is typically from about 0.02 to 0.5%, and preferably from about 0.05 to 0.15%.

Still other additives include, but are not limited to, antioxidants (e.g., hindered phenolics such as Irganox® 1010 made by Ciba Geigy Corp.), cling additives (e.g., polyisobutylene), anti-blocks, anti-slips, pigments, fillers (clear if transparency is important to the application), surfactants, and flame retardants. In-process additives, e.g. calcium stearate, water, etc., may also be used. These and other potential additives are used in the manner and amount as is commonly known in the art.

Carbon black is a common filler and/or pigment for the polymeric materials used in the practice of this invention. Any carbon black can be used and for those applications in which the finished polymeric material requires some measure of conductivity, e.g., cable coverings, the carbon black preferably exhibits at least a low level of electrical conductivity. For example, if the polymeric material is to be used as a semiconductor shield for a cable, then preferably the carbon black will reduce the electrical conductivity of the polymeric material to less than 500 ohm-meter, more preferably to less than 250 ohm-meter, and even more preferably to less than 100 ohm-meter.

Examples of carbon blacks that can be used in the practice of this invention include furnace black, acetylene black, kettchen black, channel black and thermal black. Commercially available carbon blacks include N550 carbon black sold by Cabot Corporation. The amount of carbon black admixed with the base resin, if any, is typically from about 20 to 90 parts by weight and preferably from about 40 to 80 parts by weight.

Compounding the Base Resin and the Catalyst Masterbatch

Both the base resin and the catalyst masterbatch are compounded using standard equipment and techniques. Examples of compounding equipment are internal batch mixers, such as a Banbury™ or Bolling™ internal mixer. Alternatively, continuous single, or twin screw, mixers can be used, such as Farrel™ continuous mixer, a Werner and Pfleiderer™ twin screw mixer, or a Buss™ kneading continuous extruder. The type of mixer utilized, and the operating conditions of the mixer, will affect properties of the material under mixture, such as viscosity, volume resistivity, and extruded surface smoothness.

In a preferred embodiment, the formulation of the base resin, either (1) a polyolefin containing silane functionality and a hydroxy-terminated silicone polymer, or (2) a polyolefin, vinyl silane, an optional organic initiator, and hydroxy-terminated silicone polymer, are added to a mixing vessel in any order and in the appropriate amounts, and mixed under non-reactive conditions to form an essentially homogeneous mixture of the components. The amount by weight of polyolefin (with or without silane functionality) to hydroxy-terminated silicone polymer in the mixture is typically in the range of 50:50, more typically 80:20 and even more typically 95:5.

In the formulation of the catalyst masterbatch, a large amount of cure catalyst is mixed with a representative portion of the carrier polymer, typically the same polyolefin used in the base resin but without silane functionality, to form a substantially homogeneous mixture. The amount of catalyst to carrier resin in the mixture can vary widely, but is typically 10:90, more typically 5:95 and even more typically 3:97.

Manufacture of the Tape

After the base resin is formed into an essentially homogeneous mixture, including any additives, it is extruded into a tape, i.e., a continuous strip, and allowed to solidify. The dimensions of the tape can vary widely, but typical tapes have a width dimension of between 50 and 10 millimeters (mm), a thickness dimension of between 2 and 20 mm, and an indefinite length, i.e., a length of choice that is limited only by the volume of mixture extruded. The tape can have any one of a number of different configurations. FIG. 1A illustrates base resin tape 10 in an essentially smooth and flat configuration and comprising a single layer. Alternatively and not shown, tape 10 can comprise a stack of multiple micro-layers which, in the aggregate, have a thickness comparable to that of single layer tape 10. Such tapes are well-known in the art, and are illustrated in U.S. Pat. No. 5,094,793.

Figure 1B:
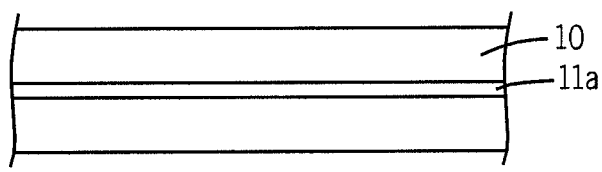
FIG. 1B is a top plan view of a base resin ribbon comprising a continuous, machine-direction groove.
Figure 1C:
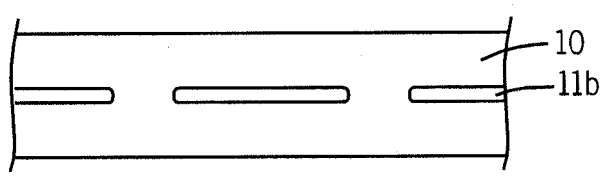
FIG. 1C is a top plan view of a base resin ribbon comprising a discontinuous or intermittent, machine-direction groove.
Figure 1D:
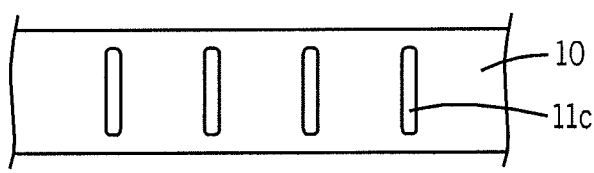
FIG. 1D is a top plan view of a base resin ribbon comprising a series of cross-direction grooves.

FIG. 1B shows the tape 10 configured with continuous machine-direction groove 11a. FIG. 1C shows tape 10 configured with intermittent or discontinuous machine-direction groove 11b. FIG. 1D shows tape 10 configured with cross-direction grooves 11c. The groove or grooves can also be at other angles to the machine direction of the ribbon. The depth, cross-section configuration (e.g., V-shaped, U-shaped, etc.), shape (e.g., straight, serpentine, etc.,), etc., of the groove can vary to choice with the understanding that the groove is preferably configured to received and physically (as opposed to chemically or adhesively) hold the catalyst masterbatch component of the finished tape product. For reasons of ease of manufacture, equipment selection and the like, preferably tape 10 is configured with a continuous, machine-direction groove.

Typically, the catalyst masterbatch is also extruded as a continuous strip, typically a strip much smaller in width and physically adjoined to the tape in any suitable manner. Here too, the strip can comprise a single layer or a stack of microlayers. If the tape is not configured with a groove or similar device to receive and hold the catalyst masterbatch, then typically it is simply laid upon the solidified base resin tape and through the combination of (i) any inherent tackiness between the base resin tape and catalyst masterbatch ribbon, and (ii) the physical restraint resulting from the collection of the tape and ribbon into a reel. Alternatively, or in addition to, the catalyst masterbatch ribbon can be pressed, with or without heating, against the base resin tape, e.g., by passing the combination of the two through one or more sets of pinch rollers, to promote the joining of the two components. If heat is used, then only sufficient heat to soften one or both of the base resin tape or catalyst masterbatch ribbon is used. Full melting of either the base resin tape or the catalyst masterbatch ribbon is not desirable.

Similarly, an adhesive can be employed to fix the catalyst masterbatch to the base resin tape. If an adhesive is used, then only an amount sufficient to promote the adhesion of the catalyst masterbatch ribbon to the base resin tape is employed. The adhesive can be employed congruent with the catalyst masterbatch ribbon, or intermittent with it. The choice of adhesive, if any, is not critical to the practice of this invention and as such, any adhesive that does not materially adversely impact the desired polymeric properties can be used. Typically, the adhesive is a pressure-sensitive adhesive; preferably a natural or synthetic rubber used either alone or in combination with one or more other adhesives. The acrylate and methacrylate-based adhesives are also useful in the practice of this invention. The adhesive can be applied as a coating, separate ribbon (e.g., lamination), or by any other convenient method. It can be applied to the full surface area of the base resin tape, or limited to the groove or grooves, or applied to the catalyst masterbatch ribbon, or both.

Figure 2A:
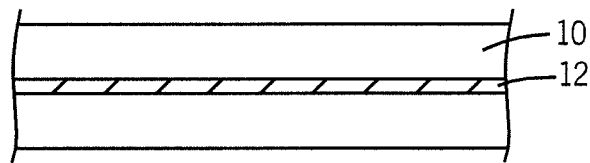
FIG. 2A is a top plan view of the ribbon of FIG. 1B with a catalyst masterbatch continuous ribbon fitted into the machine-direction groove.
Figure 2B:
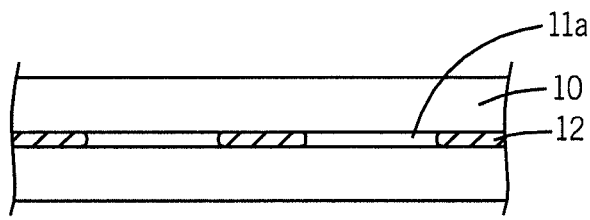
FIG. 2B is a top plan view of the ribbon of FIG. 1B with a catalyst masterbatch discontinuous ribbon fitted into the machine-direction groove.

If the base resin tape is configured with a groove or similar device, particularly a continuous, machine-direction groove, then the catalyst masterbatch is sized for and extruded in a manner that allows insertion into the groove. Here too, insertion of the catalyst masterbatch ribbon into the groove on the base resin tape can be aided through the application of pressure, e.g., the use of one or more sets of pinch rollers. FIG. 2A illustrates continuous catalyst masterbatch ribbon 12 inserted into continuous machine-direction groove 11a (not shown) of tape 10. Although the catalyst masterbatch strip can also be of indefinite length, it can also be much shorter and fitted to the base resin tape on an intermittent or discontinuous basis as illustrated in FIG. 2B. The catalyst masterbatch is fitted to the base resin tape such that it represents 3 to 5 wt % of the combined weight of the base resin and catalyst masterbatch so as not to interfere with crosslinking efficiency of the base resin tape.

Figure 3:
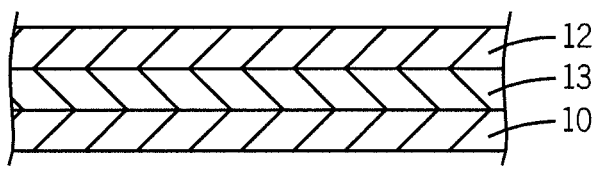
FIG. 3 is a cross-sectional view of a three layer tape comprising a catalyst masterbatch layer and a base resin layer separated by a barrier layer.

In an alternative embodiment base resin tape 10 and catalyst masterbatch ribbon 12 are separated by intermediate barrier layer 13 as illustrated in FIG. 3. Here too, the barrier resin layer can be a single layer or a stack of micro-layers. This intermediate layer can comprise any material that will delay the contact of the catalyst of the masterbatch with the base resin tape. Such materials include, but are not limited to, functional copolymers, e.g., nylon, Saran, ethylene vinyl alcohol copolymer, and the like. In this embodiment, the final product tape, i.e., the tape comprising the three layers of base resin, barrier resin and catalyst masterbatch, is typically a multilayered structure with each layer of approximately the same width and length although the thickness of each layer is likely different with the base resin layer the thickest and the catalyst masterbatch layer the thinnest. The presence of the intermediate barrier layer enhances the life of the final product tape by preventing pre-mature reaction (scorching) of the polyolefin containing silane functionality and the hydroxy-terminated silicone polymer until the tape is fed to an extruder and the tape components melt blended with one another prior to extrusion.

Figure 4:
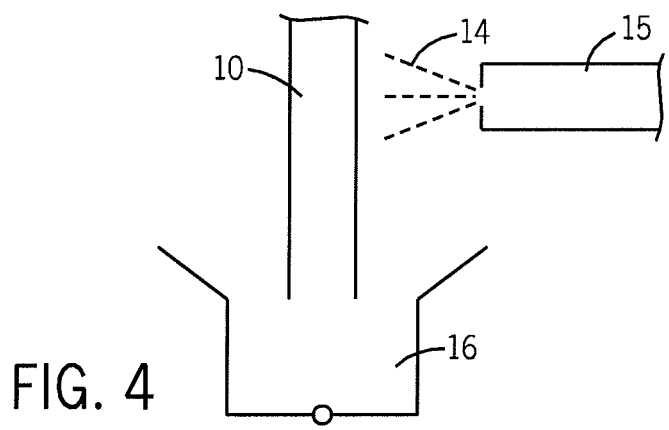
FIG. 4 is a schematic of a sequence of process steps comprising dosing a base resin ribbon with a catalyst as the base resin ribbon layer is fed to an injection molding extruder.

In another embodiment the catalyst masterbatch, or simply and preferably just catalyst, is dosed onto the base resin ribbon just prior to or simultaneously with the feeding of the ribbon to an extruder. This embodiment is illustrated by the schematic of FIG. 4. Base resin ribbon 10 is fed directly to extruder 16. As the base resin ribbon is fed into the injection molding machine, the tape is dosed, e.g., sprayed, with catalyst 14 from pump or other delivery device 15. Since shelf life of the final product tape, e.g., base resin ribbon and catalyst, is not a concern in this embodiment, neither a carrier resin nor a barrier layer is required. However, this embodiment does encourage preparation of the final tape product at the site of the extrusion or molding operation (although the tape will have a limited shelf life under the ambient conditions that prevail outside of the extruder).

Alternative dosing methods include passing the base resin tape through a bath comprising the catalyst prior to feeding the tape to an injection molding machine, depositing catalyst in the form of a full or partial coating onto the base resin tape by any coating technique, and feeding the catalyst, either neat or in the form of a masterbatch, directly into the injection molding machine apart from but simultaneously with or prior to the feeding of the base resin tape to the injection molding machine. Conventional injection molding machines typically have a zone or compartment in which components of a formulation can be homogeneously blended before transferred to the mold or extruder, and to this zone or compartment is where the base resin tape and catalyst are fed.

Current rubber injection molding technology uses tapes made from pre-compounded and fully homogenized peroxide based materials. While these materials have a relatively good shelf life when stored at room temperature, this approach is not useful with materials that inherently reactive materials over a broad range of temperatures. The tapes and processes of this invention are particularly useful in the field of moisture-curable or hydroxy-silicone cured resins systems and applications.

Although the invention has been described in considerable detail through the preceding description, drawings and examples, this detail is for the purpose of illustration. One skilled in the art can make many variations and modifications without departing from the spirit and scope of the invention as described in the appended claims.

What is claimed is:

1. An extruder feed tape comprising (A) a first ribbon having a thickness of 2-20 mm and comprising a crosslinkable resin, and (B) a second ribbon comprising a catalyst masterbatch, the second ribbon carried on the first ribbon and the crosslinkable resin and catalyst masterbatch reactive with one another under ambient conditions.

2. The tape of claim 1 in which the first ribbon comprises (1)(a) a polyolefin containing at least one silane functionality, and (1)(b) a hydroxy-terminated silicone polymer, or (2) a blend of a vinyl silane, polyolefin, organic initiator and a hydroxy-terminated silicone polymer.

3. The tape of claim 2 in which the first and second ribbons are in direct contact with one another.

4. The tape of claim 2 in which the first and second ribbons are separated by a third ribbon, the third ribbon comprising the polyolefin of the first ribbon but without the silane functionality.

5. The tape of claim 2 in which the first ribbon comprises a groove shaped and sized to receive and hold the second ribbon.

6. The tape of claim 2 in which the organic initiator is a peroxide.

7. The tape of claim 2 in which at least one of the first and second ribbons comprise micro-layers.

8. The tape of claim 2 further comprising a barrier layer intermediate of the first and second ribbons.

9. The tape of claim 2 in which the second ribbon is joined to the first ribbon with the assist of an adhesive.

* * * * *